US010966099B2

(12) United States Patent
Vanek et al.

(10) Patent No.: US 10,966,099 B2
(45) Date of Patent: Mar. 30, 2021

(54) COMPUTING WIRELESS DEPLOYMENT IN AN AREA (71) Applicant: Nokia Solutions and Networks Oy, Espoo (FI)

(72) Inventors: Ales Vanek, Woodinville, WA (US); Reinhard Voese, Coppell, TX (US); Amit Mehrotra, Plano, TX (US); Jack Zatz, Freehold, NJ (US); Peter Love, St Ives (GB); Carl Wijting, Espoo (FI); Anoop Kulkarni, Naperville, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/487,880

(22) PCT Filed: Feb. 23, 2018

(86) PCT No.: PCT/US2018/019502
§ 371 (c)(1),
(2) Date: Aug. 22, 2019

(87) PCT Pub. No.: WO2018/156943
PCT Pub. Date: Aug. 30, 2018

(65) Prior Publication Data
US 2020/0213864 A1 Jul. 2, 2020

Related U.S. Application Data (60) Provisional application No. 62/463,342, filed on Feb. 24, 2017.

(51) Int. Cl.
H04W 16/18 (2009.01)
G06Q 30/02 (2012.01)
(Continued)

(52) U.S. Cl.
CPC ...... H04W 16/18 (2013.01); G06Q 10/06393 (2013.01); G06Q 30/0201 (2013.01);
(Continued)

(58) Field of Classification Search
CPC ..... H04W 24/08; H04W 40/14; H04W 16/18; H04W 24/02; H04W 84/045;
(Continued)

(56) References Cited

U.S. PATENT DOCUMENTS

2002/0178075 A1* 11/2002 Emerick .......... G06Q 10/06393
705/26.41
2004/0143428 A1* 7/2004 Rappaport .............. H04L 43/00
703/22
(Continued)

OTHER PUBLICATIONS

"3rd Generation Partnership Project; Technical Specification Group Radio Access Network; Evolved Universal Terrestrial Radio Access (E-UTRA); Physical layer procedures (Release 15)", 3GPP TS 36.213 V15.0.0, Dec. 2017, pp. 1-493.
(Continued)

Primary Examiner — Daniel Lai
(74) Attorney, Agent, or Firm — Nokia Technologies Oy (57) ABSTRACT Various communication systems may benefit from determining a venue value index before deploying wireless communication in the area. A method may include identifying the one or more wireless coverage issues within an area. The method may also include receiving data demand information for the area having the identified one or more wireless coverage issues. In addition, the method may include receiving or determining a total cost of ownership. The total cost of ownership may include a cost of fixing the one or more wireless coverage issues within the area. Further, the method may include calculating a venue value index of the area based on at least one of the total cost of ownership, the data demand information, or an average spectrum efficiency. The
(Continued)

method may in addition include performing at least one network administrative task based on the venue value index.

18 Claims, 5 Drawing Sheets

(51) Int. Cl.
  *H04L 12/24* (2006.01)
  *G06Q 10/06* (2012.01)
  *G06Q 50/32* (2012.01)
  *H04W 24/02* (2009.01)

(52) U.S. Cl.
  CPC ......... *G06Q 50/32* (2013.01); *H04L 41/5045* (2013.01); *H04W 24/02* (2013.01)

(58) Field of Classification Search
  CPC ............. H04W 88/12; H04W 28/0226; H04W 28/0268; G06Q 30/0201; G06Q 10/06393; G06Q 50/32; H04L 41/5045
  See application file for complete search history.

(56) References Cited

U.S. PATENT DOCUMENTS

| | | | | |
|---|---|---|---|---|
| 2008/0108345 | A1* | 5/2008 | Calin | H04W 16/00 455/424 |
| 2008/0280565 | A1* | 11/2008 | Jevremovic | H04W 16/20 455/67.7 |
| 2009/0106064 | A1 | 4/2009 | Egner et al. | |
| 2010/0281095 | A1 | 11/2010 | Wehner et al. | |
| 2013/0310048 | A1* | 11/2013 | Hunukumbure | H04W 52/0206 455/443 |
| 2014/0156483 | A1* | 6/2014 | Egner | G06Q 10/0637 705/35 |
| 2016/0028471 | A1* | 1/2016 | Boss | H04W 24/02 455/406 |
| 2016/0210569 | A1 | 7/2016 | Enck | |

OTHER PUBLICATIONS

"3rd Generation Partnership Project; Technical Specification Group Radio Access Network; Feasibility study for Further Advancements for E-UTRA (LTE-Advanced) (Release 14)", 3GPP TR 36.912 V14.0.0, Mar. 2017, pp. 1-62.

"3rd Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.2.0, Mar. 2017, pp. 1-105.

International Search Report and Written Opinion received for corresponding Patent Cooperation Treaty Application No. PCT/US2018/019502, dated Apr. 30, 2018, 7 pages.

Extended European Search Report received for corresponding European Patent Application No. 18757520.4, dated Sep. 9, 2020, 8 pages.

* cited by examiner

COMPUTING WIRELESS DEPLOYMENT IN AN AREA

CROSS REFERENCE TO RELATED APPLICATION

This application claims priority to U.S. Provisional Patent Application No. 62/463,342 filed on Feb. 24, 2017. The entire content of the above-referenced application is hereby incorporated by reference.

BACKGROUND

Field

Various communication systems may benefit from improved wireless deployment in an area. For example, it may be helpful for a network operator or an owner of an area to determine a venue value index before deploying wireless communication in the area.

Description of the Related Art

Mobile network operators and enterprise building owners have to deal with the challenge of determining a return on investment (ROI) when deploying wireless communication in a given area. A ROI may be manifested by the actual use of the increased network capacity caused by deploying the wireless communication in the given area. Deploying wireless communication in an area therefore includes the installation of access points in the area. An access point may include a network entity that allows for mobile wireless communication or non-mobile wireless communication between the network and a user equipment. For example, the access point may be a Third Generation Partnership Project (3GPP) small cell, such as a Long Term Evolution (LTE) small cell or a fifth generation (5G) small cell, wireless land access network (WLAN) routers, or a distributed antenna system (DAS).

Generally, deployment of such wireless communication technology is assumed to be best suited for dense urban areas or high occupancy buildings. This assumption, however, neglects additional factors that may influence the ROI when deploying small cells, WLAN routers, or DAS. Mobile network operators and enterprise building owners are therefore not making efficient use of their capital when investing in the deployment of wireless communications in an area, especially when the area involves an indoor area within a building.

SUMMARY

According to certain embodiments, an apparatus may include at least one memory including computer program code, and at least one processor. The at least one memory and the computer program code may be configured, with the at least one processor, to cause the apparatus at least to identify one or more wireless coverage issue within an area. The at least one memory and the computer program code may also be configured, with the at least one processor, to cause the apparatus at least to receive data demand information for the area having the identified one or more wireless coverage issues. In addition, the at least one memory and the computer program code may be configured, with the at least one processor, to cause the apparatus at least to receive or determine a total cost of ownership. The total cost of ownership can include a cost of fixing the one or more wireless coverage issues within the area. Further, the at least one memory and the computer program code may be configured, with the at least one processor, to cause the apparatus at least to calculate a venue value index of the area based on at least one of the total cost of ownership, the data demand information, or an average spectrum efficiency, and perform at least one network administrative task based on the venue value index.

An apparatus, in certain embodiments, may include means for identifying one or more wireless coverage issue within an area. The apparatus may also include means for receiving data demand information for the area having the identified one or more wireless coverage issues. In addition, the apparatus may include means for receiving or determining a total cost of ownership. The total cost of ownership can include a cost of fixing the one or more wireless coverage issues within the area. Further, the apparatus may include means for calculating a venue value index of the area based on at least one of the total cost of ownership, the data demand information, or an average spectrum efficiency, and performing at least one network administrative task based on the venue value index.

According to certain embodiments, a non-transitory computer-readable medium encoding instructions that, when executed in hardware, perform a process. The process may include identifying one or more wireless coverage issue within an area. The process may also include receiving data demand information for the area having the identified one or more wireless coverage issues. In addition, the process may include receiving or determining a total cost of ownership. The total cost of ownership can include a cost of fixing the one or more wireless coverage issues within the area. Further, the process may include calculating a venue value index of the area based on at least one of the total cost of ownership, the data demand information, or an average spectrum efficiency, and performing at least one network administrative task based on the venue value index.

According to certain other embodiments, a computer program product may encode instructions for performing a process. The process may include identifying one or more wireless coverage issue within an area. The process may also include receiving data demand information for the area having the identified one or more wireless coverage issues. In addition, the process may include receiving or determining a total cost of ownership. The total cost of ownership can include a cost of fixing the one or more wireless coverage issues within the area. Further, the process may include calculating a venue value index of the area based on at least one of the total cost of ownership, the data demand information, or an average spectrum efficiency, and performing at least one network administrative task based on the venue value index.

A method, in certain embodiments, may include identifying one or more wireless coverage issue within an area. The method may also include receiving data demand information for the area having the identified one or more wireless coverage issues. In addition, the method may include receiving or determining a total cost of ownership. The total cost of ownership can include a cost of fixing the one or more wireless coverage issues within the area. Further, the method may include calculating a venue value index of the area based on at least one of the total cost of ownership, the data demand information, or an average spectrum efficiency. The method may in addition include performing at least one network administrative task based on the venue value index.

In a variant, the venue value index of the area may be calculated based on the total cost of ownership, the data demand information, and an average spectrum efficiency.

In a further variant, wherein the administrative task may include reporting the venue value index from the network entity to a network operator or an owner of the area.

In a variant, the venue value index may be used by a network operator or an owner of the area to determine whether to deploy wireless communication to fix the one or more wireless coverage issues within the area based on the venue value index.

In another variant, the network operator or the operator may deploy the wireless communication to fix the one or more wireless coverage issues, wherein the deploying may include installing access points in the area.

In a further variant, the method may include determining a return on investment for wireless communication deployment within the area based on the venue value index.

In a variant, the method may include displaying the return on investment and the venue value index to a network operator or an owner of the area, wherein the return on investment and the venue value index may be displayed on a user equipment.

In yet another variant, the method may include selecting the area to be assessed.

In a variant, the area may be within an individual building.

In an additional variant, the data demand may include current unmet data demand and forecast unmet data demand.

In a further variant, wherein the data demand may be calculated based on key performance indicators, and wherein the data demand comprises a busy hour excess traffic demand and a predicted excess traffic demand of the area.

In a variant, the busy hour excess traffic demand may depend on at least one of an extrapolated busy hour total traffic demand or a data volume at a hundred percent physical radio bearer utilization.

In another variant, the method may include creating a coverage prediction map for all cells in the area. The coverage prediction map may include an indication of at least a best server, reference signal received power, or signal-to-interference-plus-noise ratio in the area. The method may also include displaying the distribution map on a user equipment.

In a further variant, the method may include creating a user density distribution map for all cells in the area. The user density distribution map may include the data demand information of the area. The method may also include displaying the distribution map on a user equipment.

In another variant, the method may include embedding a busy hour excess traffic demand into the user density distribution map. The method may also include displaying the user distribution map with the embedded busy hour excess traffic demand on a user equipment.

BRIEF DESCRIPTION OF THE DRAWINGS

For proper understanding of the invention, reference should be made to the accompanying drawings, wherein.

DETAILED DESCRIPTION

Certain embodiments allow for effectively and accurately determining a ROI when investing in wireless communication deployment in a given area. In determining the ROI, a venue value index (VVI), also referred to as a VVI score, may be calculated and used for each area. The VVI scores for all of the areas may then be ranked, and a determination may be made as to which areas will yield the best ROI. A higher VVI may indicate a greater ROI in a given area, while a lower VVI may indicate a lower ROI. Calculating of the VVI, for example, may account for at least the radio frequency (RF) coverage within an area, data usage within an area, data demand that may be unmet by the current wireless coverage, and/or deployment cost of the wireless communication system to the network operator or the owner of the area.

Certain factors, such as data demand, may account for both current data demand, as well as future data demand. Future data demand may be forecast or predicted based on mobile or user equipment usage growth and expansion, for example. The deployment costs may be a comprehensive calculation of the total cost of ownership (TCO). The TCO may account for at least a power cost, a lease cost, a backhaul cost, a materials cost, and/or a work time estimate. Any other factor which can affect costs may be used to determine the TCO.

The data demand and/or the TCO may be used in calculating the VVI and the ROI, which may then be used by the operator or owner to determine whether to deploy the wireless communication system in one or more areas. If the operator or owner views the ROI as favorable, the operator and/or owner may deploy the wireless communication system in a given area. If the ROI is viewed as unfavorable, the operator and/or owner may choose not to deploy a wireless communication system in one or more areas.

Deploying the wireless communication system may include upgrading an area's wireless coverage. The upgrade may include installing access points, such as small cells, WLAN routers, or DAS, in order to fix or improve current or predicted issues with the wireless coverage provided in the area. In other embodiments, the upgrade may include installing for a first time wireless communications in an area that did not have any wireless coverage previously.

Figure 1:
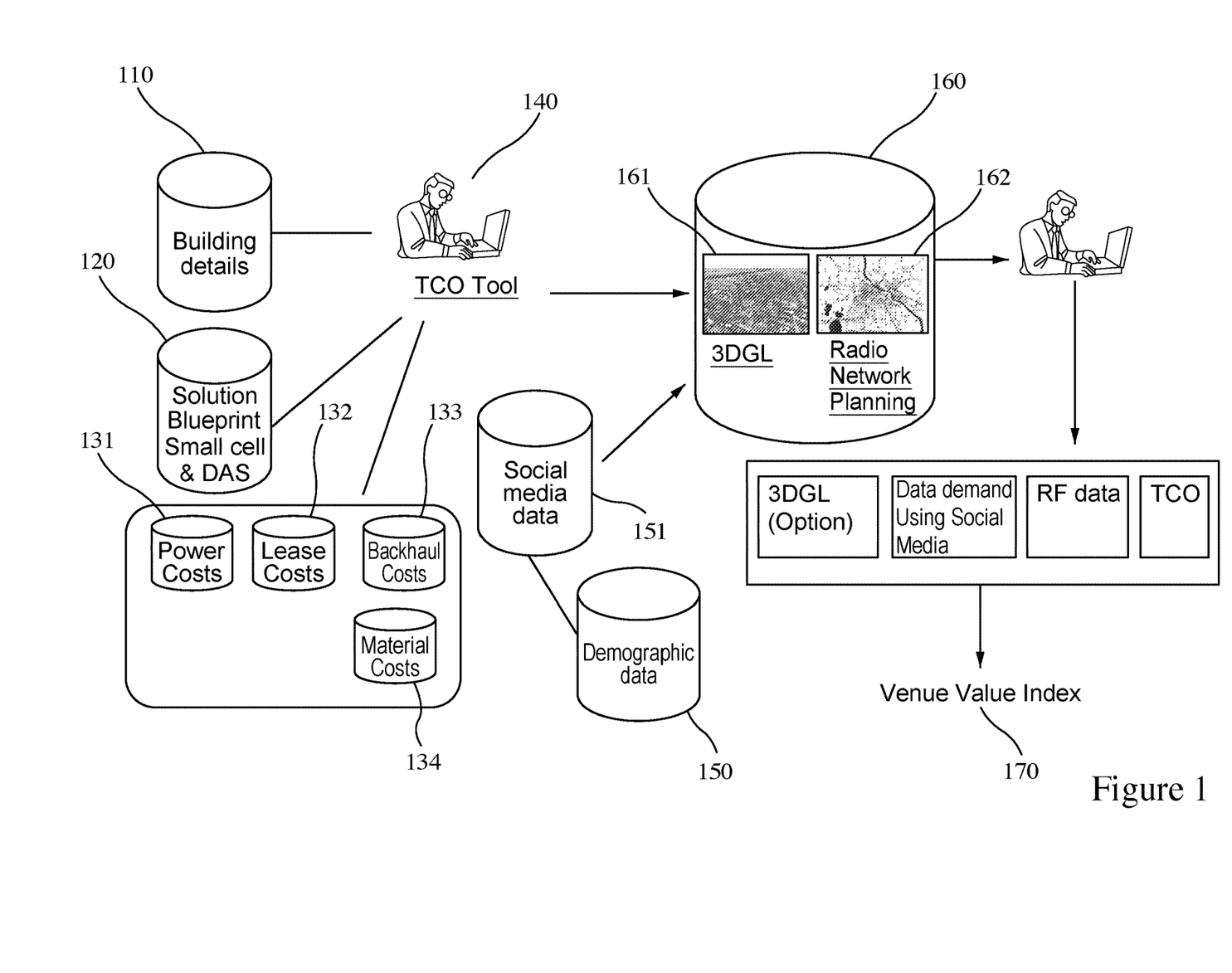
FIG. 1 illustrates a venue value index calculation process according to certain embodiments.

FIG. 1 illustrates a VVI calculation process according to certain embodiments. Network entity 160, shown in FIG. 1, may calculate, select, determine, receive, or send all of the information illustrated in FIG. 1. The calculated VVI may be specific to a given area. The area may be, for example, a building, a set of buildings, an enterprise venue, such as an arena or a stadium, or any other kind of facility or physical location that may benefit from wireless connectivity. The area may also be more specific, in certain embodiments, and may be defined as a floor or a location within a building. In certain other embodiments, the area may be more general than a building, and may be defined by a set of buildings, such as a campus. The selected area may also be characterized by a shape of the area, such as a polygon or a circle, which may be taken into account when determining the VVI.

In certain embodiments, the first step in calculating the VVI may include selecting an area to be assessed. In the embodiment shown in FIG. 1, the area may be a building. As such, building details 110, which may include various building characteristics and/or dimensions may be gathered and assessed. For example, size, layout, number of floors, number of suites, offices, or apartments, number of occupying tenants, and/or whether the building is a low rise or a high rise are examples of some building details 110. In addition, the VVI may account for the type of solution the owner or the operator is seeking. For example, in FIG. 1 solution blueprint 120 includes the use of small cells and DAS. This indicates that the area owner and the network operator are looking to evaluate the VVI for deploying wireless communications via 3GPP small cells and/or DAS.

Once the area to be assessed is selected, for example an individual building may be selected, the one or more wireless coverage issues within the given area may be identified. In some embodiments, the coverage issues may be identified by monitoring, collecting, aggregating, and/or receiving information from users of the wireless communication system. For example, when a user equipment (UE), such as a mobile device, experiences problems either connecting to or using the wireless communication system, a notification may be sent from the UE to network entity 160. The notification may inform the base station of the error being experienced by the user equipment.

In some embodiments, the network entity may monitor the given area, and notice the lack of connectivity to the wireless communication system within the monitored area. In another embodiment, the base station or network entity may notice that communications from the area are received at a slower rate than from other nearby areas, or that the buffer at the given area may be particularly long. The network entity 160 may therefore flag or identify the area as having issues. In other embodiments, data relating to coverage issues may be monitored, collected, aggregated, and/or analyzed by another network entity, which may then simply send network entity 160 a report that includes the coverage issues The amount of data demanded by users within the area may then be determined. In some embodiments, the data demand information may be received by the network entity 160, after being collected in another network entity. As can be seen in FIG. 1, the data demand information may include demographic data 150. In certain embodiments, social media data 151 may be collected in order to better assess the data demand in the area. Social media data 151, as well as RF coverage data, may be used to identify the unmet, unserved, or excess data demand. The data demand may therefore include a current measurement of the data demand in the area and/or a forecast or prediction of the unmet, unserved, or excess data demand that may exist at some future point in time.

The TCO for deploying wireless communication may be determined for the area. The TCO may either be determined at network entity 160, or determined at another network entity and then received by network entity 160. The TCO may, for example, represent the total cost of fixing the one or more wireless coverage issues within the given area. In determining the TCO, TCO tool 140 may be used. TCO tool 140 may either be included in network entity 160, or may be a part of another network entity. In some embodiment, TCO tool 140 may be an entity of its own, including at least one memory including computer program, at least one processor, and at least one transceiver.

TCO tool 140 may determine the TCO of deployment by accounting for at least power costs 131, lease costs 132, backhaul costs 133, and/or material costs 134 associated with the deployment of the wireless communication system. The above factors taken into account by TCO tool 140 are merely an exemplary list. Any other factor that may affect the cost of deployment may be taken into consideration.

The TCO may also depend on the characteristics of the area. For example, in FIG. 1, building details 110 may be taken into consideration by TCO tool 140. Every area or building is unique in its physical characteristics, and those unique physical characteristics can impact the costs associated with the design and deployment of access points, and associated equipment and cabling. In addition, the type of access points used, such as small cells versus DAS, may also affect the TCO.

In certain embodiments, the above mentioned information may be received, determined, and/or identified by network entity 160. Network entity 160 may then, in some embodiments, use a three-dimensional guidance law (3DGL) 161 to model the area to be assessed. The model may help to better determine area or building details, which can be used to increase the accuracy of calculated VVI 170 of the area. In other embodiments, radio network planning 162 principles may also be used by network entity 160. The principles may be either predetermined or determined by network entity 160, and may be applied to the data received or collected by network 160 in order to further improve the accuracy of the VVI calculation.

The VVI score 170 may be calculated for a given area at least based on one of the TOC, data demand information, RF data, such as the average spectrum efficiency, and/or the 3DGL. Based on the VVI, the owner of the area or the network operator may determine whether to deploy wireless communication to fix the one or more wireless coverage issues within the area. If so, wireless communication may be deployed. The deployment of the wireless communication may include installation of at least one access point in the area. The VVI may therefore indicate the most economical deployment of access points that will yield the best ROI.

In certain embodiments, the VVI may be calculated by the following equation:

$$VVI = \frac{ETD}{(TCO \times ASE)}.$$

ETD represents the excess traffic demand in megabytes, which is the amount of customer data volume demand the LTE or wireless network is not able to carry within the area. ASE represents the average spectral efficiency in bits per second per hertz, which is the information rate that can be transmitted over a given bandwidth spectrum. The above VVI equation is merely exemplary, and any other VVI equation may be used, including equations that take into account factors that are not included in the above equation.

ETD may be calculated for downlink transmissions from the access points to a user equipment in the area. ETD calculation may be based, for example, on an LTE radio cell busy hour (BH) excess traffic demand and/or an excess traffic demand in the area. In other embodiments, a WLAN router BH excess traffic demand and/or DAS BH excess traffic demand may be used. In certain embodiments, the BH excess traffic demand may depend upon key performance indicators (KPIs). The KPIs may be calculated per radio cell based on hourly aggregated and/or averaged data samples. The data samples may be stored in the network Operating Support System database.

The KPIs, for example, may include the average number of active users (NAU) with pending data transmissions in a buffer per hour. Another example of a KPI may be an hourly percentage of the physical radio bearer (PRB) utilization of the Physical Downlink Shared Channel (PDSCH). The PRB utilization may represent an amount of the available spectrum used within an area. An additional example of a KPI may include an hourly aggregated total of the data volume transmitted over an air interface.

In certain embodiments, the hourly KPI samples for which the average PRB utilization is lower than 80% may be filtered. In other words, the KPI samples for which the cell load is lower than 80% are separated from those KPI samples for which the cell load is greater than 80%. A chart may then be created based on the dependency between the data volume and the NAU for each cell separately. For those filtered hourly samples in which PRB utilization is lower than 80%, the data volume can be approximated as being linearly dependent on the NAU. Using this approximation, data volume may then be linearly extrapolated for higher values of NAU. The extrapolation may include higher values of NAU, whose current average KPI samples indicate a PRB utilization that is higher than 80%. Extrapolation of BH samples of NAU may represent the BH total traffic demand in a respective cell.

The data volume at a 100% PRB utilization may then be calculated, in some embodiments. 100% PRB utilization may represent the maximum possible amount of data that a cell may transmit during one hour given the bandwidth and the RF interference from neighboring cells. When the cell is sufficiently loaded this value can be approximated by using the following equation for all hourly samples:

$$DataVolume \text{ at } 100\% \text{ } PRB \text{ utilization} = \frac{DataVolume + \frac{DataVolume}{PRB \text{ utilization}}}{2}.$$

The $$\frac{DataVolume}{PRB \text{ utilization}}$$

may represent an inverted data volume.

Figure 2:
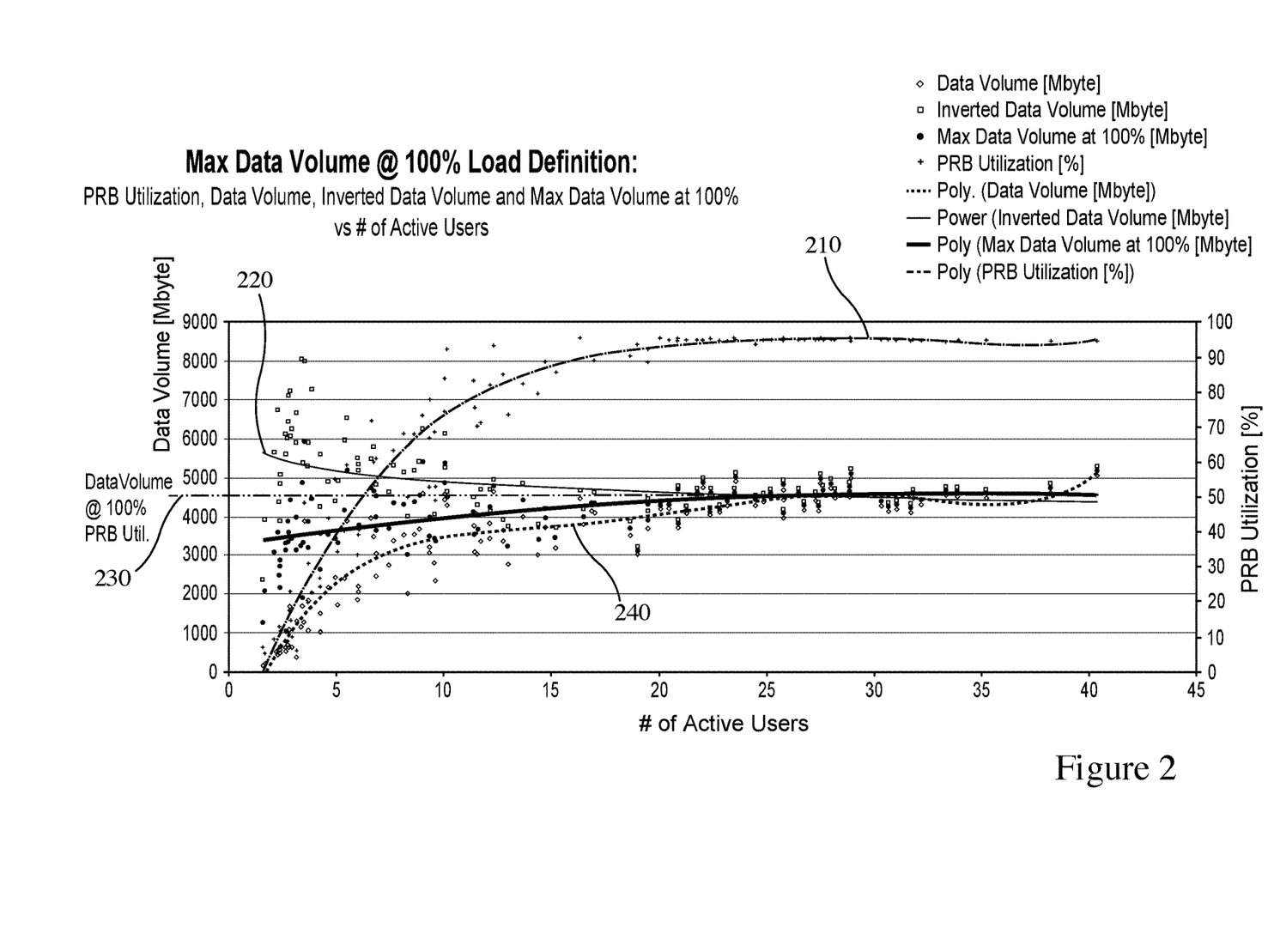
FIG. 2 illustrates a chart relating to data volume according to certain embodiments.

FIG. 2 illustrates a chart relating to data volume according to certain embodiments. In particular, FIG. 2 illustrates the maximum data volume at 100% cell load or 100% PRB utilization. Line 230 represents the maximum data volume at 100% cell load, which is roughly 4,500 megabytes per hour. Line 210 represents the PRB utilization, while line 220 represents the inverted data volume. In addition, line 240 represents the data volume per NAU. When the PTB utilization is lower than 80%, the data volume can be approximated as being linearly dependent on the number of active users. In other words, as the number of active users increases the PRB utilization increases linearly.

In certain embodiments, the cell BH excess traffic demand may be calculated based on the following equation: Cell BH Excess Trafic Demand=Extrapolated BH Total Traffic Demand−Data Volume at 100% PRB Utilization. The extrapolated BH total traffic demand may be calculated as an average of the daily BH values over a one week sample size. When a maximum PRB utilization remains below 80%, the extrapolated BH total traffic demand remains smaller than the data volume at 100% PRB utilization, and subsequently excess traffic may equal zero.

Figure 3:
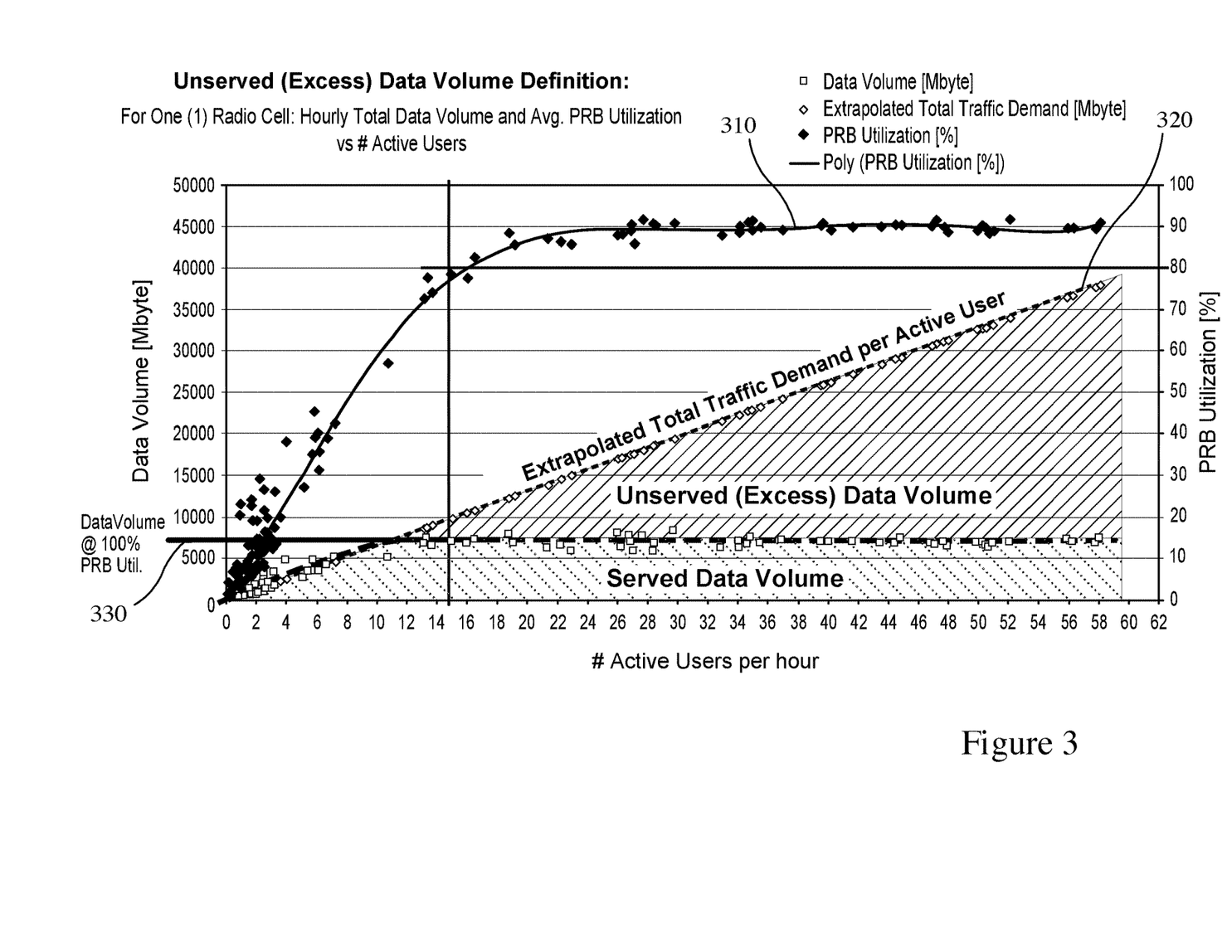
FIG. 3 illustrates a chart relating to data volume according to certain embodiments.

FIG. 3 illustrates a chart relating to data volume according to certain embodiments. In particular, FIG. 3 illustrates unmet, unserved, or excess data volume. Line 310 may represent the PRB utilization percentage, while line 320 represents the extrapolated total traffic demand per active user. As discussed above, for PRB utilization under 80%, the data volume can be approximated to be linearly dependent on the number of active users per hour. Line 330 represents the served data volume at 100% PRB utilization. As can be seen in FIG. 3, the unserved excess data volume may be determined by subtracting the served data volume at 100% PRB utilization from the extrapolated total traffic demand per active user.

In certain embodiments, based on the excess traffic demand in a given area coverage predictions may be performed for all cells. For example, a coverage map or plot of the best server, reference signal received power (RSRP), and signal-to-interference-plus-noise ratio (SINR) may be created. The overage map may then be displayed by network entity 160 or by a user equipment. A user density distribution map for the given area may also be created, in certain embodiments. The user density distribution map may be created using any available method. For example, one option is to use census block data, and to combine the census block data with additional user distribution heat maps available from multiple social media services. Another option, for example, may be to use geolocated user density maps provided by the network operator.

In some other embodiments, a BH excess traffic demand map may be generated. For each cell within the analysis region, the BH excess traffic demand may be proportionally spread over the user density distribution map per map bin. Within each cell's best serving area, the cell level value of the BH excess traffic demand may be spread or distributed over the initial user density map, so that within each cell's serving area the new distribution of cell level BH excess traffic demand follows the density distribution of the initial user density map. This map may create a composite BH excess traffic demand map for the best server areas with excess traffic demand for the entire analysis region. The best server area may indicate a location within the assessed area in which adding an access point would render the best ROI. The map may be displayed to a network operator and/or an owner of the area via network entity 160 or a user equipment.

The excess traffic demand may be obtained by calculating the amount of total excess traffic from the BH excess traffic demand map within the perimeter of the area to be assessed. For example, the amount of total excess traffic from the BH excess traffic demand map may be calculated within a building. Cells without excess traffic may be shown as not having any traffic density in their best server areas.

ASE may also be taken into consideration when calculating the VVI. Within the analysis region, the signal strength coverage propagation map, for example, a RSRP map, and/or the SINR coverage map may be generated depending on the respective individual BH PRB utilization. In certain embodiments, a spectral efficiency map may then be created and/or displayed for each map bin/point from the respective LTE radio link curve. The LTE radio link curve may account for the SINR, a modulation coding scheme (MCS), and a spectral efficiency look up table. Additional detail regarding the LTE radio link curve may be found in 3GPP TS 36.213, 3GPP TS 36.912, and 3GPP TS 36.814. 3GPP TS 36.213, 3GPP TS 36.912, and 3GPP TS 36.814 are hereby incorporated by reference. The ASE of the selected area may then be obtained by calculating the ASE within the perimeter of the given area.

Figure 4:
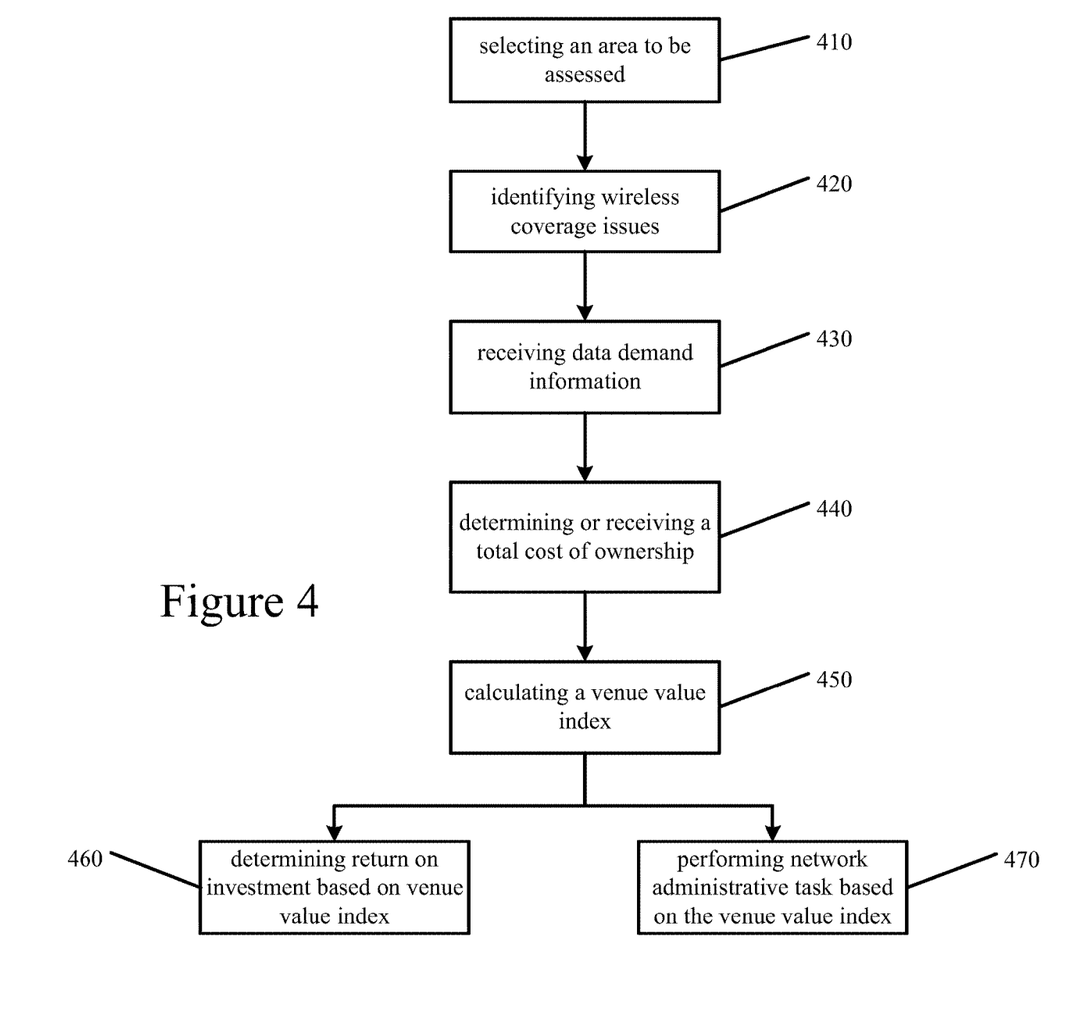
FIG. 4 illustrates a flow diagram according to certain embodiments.

FIG. 4 illustrates a flow diagram according to certain embodiments. FIG. 4 illustrates an embodiment of a method performed by network entity, such as network entity 160 shown in FIG. 1. In step 410, the network entity may select an area to be assessed. The area may, for example, be a building. In step 420, the network entity may identify the one or more wireless coverage issues within the area. Alternatively, or in addition to, the network entity may receive a report including one or more wireless coverage issues that were identified by another network entity. In step 430, the network may receive data demand information for the area having the identified one or more wireless coverage issues. A total cost of ownership of fixing the one or more wireless coverage issues may then be received or determined by the network entity, as shown in step 440. The total cost of ownership may include a cost of fixing the one or more wireless coverage issues within the area. In step 450, the server may then calculate a venue value index of the area at least based on at least one of the total cost of ownership, the data demand information, or the average spectrum efficiency.

Based on the venue value index, a network operator or an owner of the area may determine whether to deploy wireless communication to fix the one or more wireless coverage issues within the area based on the VVI. In step 460, the network entity may also determine a return on investment for wireless communication deployment within the area based on the venue value index. If the ROI and/or the VVI are acceptable, the operator and/or owner may decide to deploy the wireless communication to fix the one or more wireless coverage issues. The deployment may include installing access points in the area, for example. In certain embodiments, as shown in step 470, the network entity may perform at least one network administrative task based on the venue value index. For example, the administrative task may be to report the venue value index to the network operator or the owner of the area, to adjust network coverage, to adjust the quality of service or the quality of experience, to change the MCS, or to offload certain data.

Figure 5:
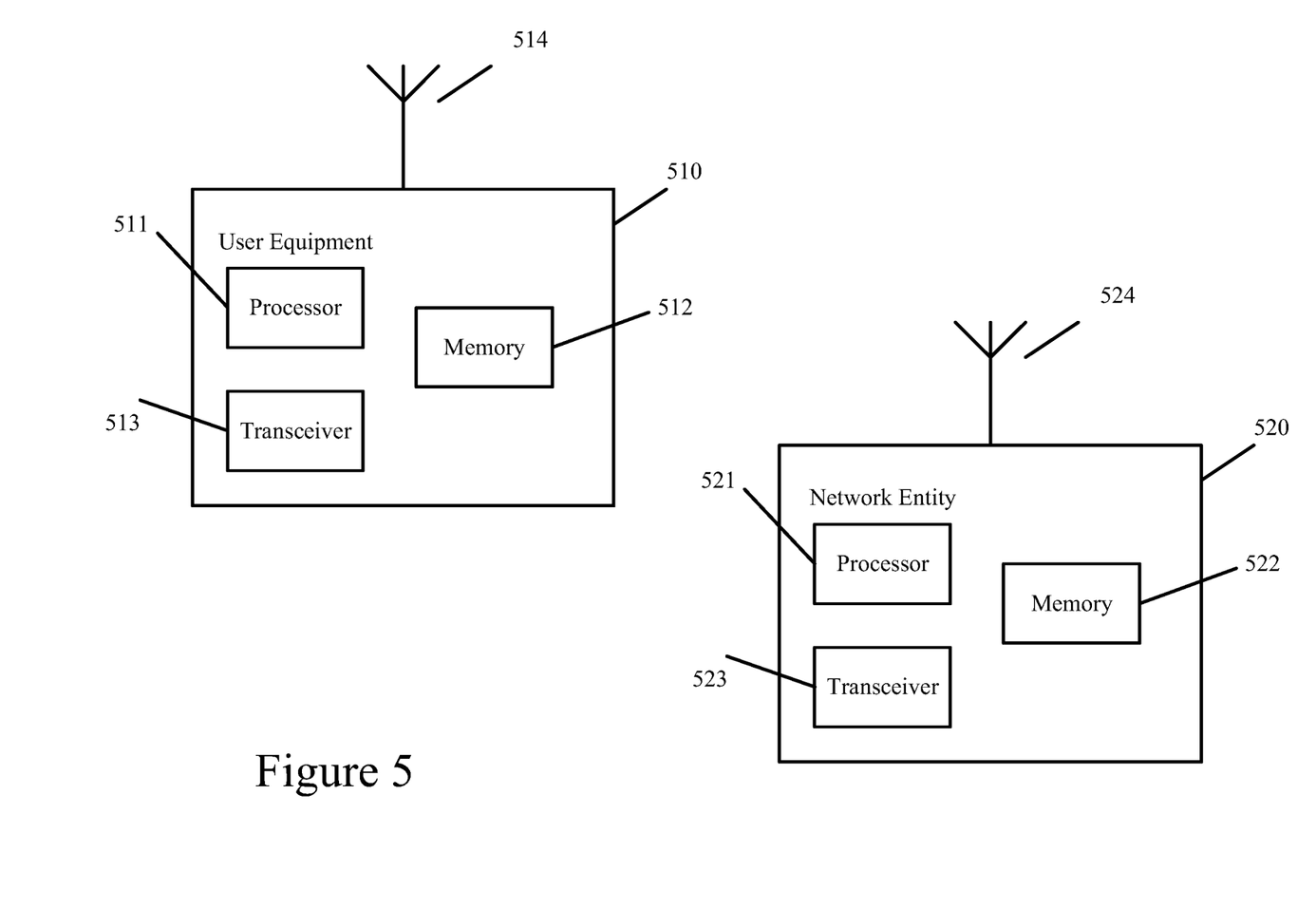
FIG. 5 illustrates a system according to certain embodiments

FIG. 5 illustrates a system according to certain embodiments. It should be understood that each signal or block in FIGS. 1-4 may be implemented by various means or their combinations, such as hardware, software, firmware, one or more processors and/or circuitry. In one embodiment, a system may include several devices, such as, for example, network entity 520 or user equipment (UE) 510. The system may include more than one UE 510 and more than one network entity 520. Network entity 520 may be a base transceiver station (BTS), a 3GPP small cell, a WLAN router, a DAS, an access point, a network node, an access node, a server, a host, or any other network entity that may communicate with the UE.

Each of these devices may include at least one processor or control unit or module, respectively indicated as 511 and 521. At least one memory may be provided in each device, and indicated as 512 and 522, respectively. The memory may include computer program instructions or computer code contained therein. One or more transceiver 513 and 523 may be provided, and each device may also include an antenna, respectively illustrated as 514 and 524. Although only one antenna each is shown, many antennas and multiple antenna elements may be provided to each of the devices. Other configurations of these devices, for example, may be provided. For example, network entity 520 and UE 510 may be additionally configured for wired communication, in addition to wireless communication, and in such a case antennas 514 and 524 may illustrate any form of communication hardware, without being limited to merely an antenna.

Transceivers 513 and 523 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or UE 510 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. As discussed above, UE transmissions and/or communication may be used to determine the data demands of the area.

In some embodiments, an apparatus, such as a user equipment or a network entity, may include means for carrying out embodiments described above in relation to FIGS. 1-4. In certain embodiments, at least one memory including computer program code can be configured to, with the at least one processor, cause the apparatus at least to perform any of the processes described herein.

Processors 511 and 521 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 512 and 522 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 520 or UE 510, to perform any of the processes described above (see, for example, FIGS. 1-4). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

In certain embodiments, an apparatus may include circuitry configured to perform any of the processes or functions illustrated in FIGS. 1-5. Circuitry, in one example, may be hardware-only circuit implementations, such as analog and/or digital circuitry. Circuitry, in another example, may be a combination of hardware circuits and software, such as a combination of analog and/or digital hardware circuit(s) with software or firmware, and/or any portions of hardware processor(s) with software (including digital signal processor(s)), software, and at least one memory that work together to cause an apparatus to perform various processes or functions. In yet another example, circuitry may be hardware circuit(s) and or processor(s), such as a microprocessor(s) or a portion of a microprocessor(s), that include software, such as firmware for operation. Software in circuitry may not be present when it is not needed for the operation of the hardware.

Furthermore, although FIG. 5 illustrates a system including a network entity 520 and UE 510, certain embodiments may be applicable to other configurations, and configurations involving additional elements, as illustrated and discussed herein. For example, multiple user equipment devices and multiple base stations may be present, or other nodes providing similar functionality, such as nodes that combine the functionality of a user equipment and a base station, such as a relay node. The UE 510 may likewise be provided with a variety of configurations for communication other than communicating with network entity 520. For example, the UE 510 may be configured for device-to-device, machine-to-machine, or vehicle-to-vehicle communication.

The above embodiments provide for improvements to the functioning of a network and/or to the functioning of the network entities within the network, or the user equipment communicating with the network. In certain embodiments, the VVI may be used to determine in which areas deploying a wireless communication system will yield the best ROI. As part of the calculation, the total cost of ownership of the deployed wireless communication system may be determined. Deploying wireless communication may include adding access points in a given area that experiences coverage issues. The above embodiments, therefore, may increase the network capacity in areas in which excess data demand exists, which may significant improve the functioning of the network.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to NR and 5G technology, the above embodiments may apply to any 3GPP technology, including at least to LTE, LTE-advanced, 4th generation, or Internet of Things technology.

PARTIAL GLOSSARY

3GPP Third Generation Partnership Project
UE user equipment
5G fifth generation
LTE long term evolution
WLAN wireless land access networks
DAS distributed antenna system
ROI return on investment
VVI venue value index
RF radio frequency
TCO total cost of ownership
BH busy hour
PRB physical radio bearer
KPIs key performance indicators
NAU number active users
RSRP reference signal received power
SINR signal-to-interference-plus-noise ratio
MCS modulation coding scheme

We claim:
1. A method comprising:
identifying one or more wireless coverage issues within an area;
receiving data demand information for the area having the identified one or more wireless coverage issues;
receiving or determining a total cost of ownership, wherein the total cost of ownership comprises a cost of fixing the one or more wireless coverage issues within the area;
calculating a venue value index of the area based on at least one of the total cost of ownership, the data demand information, or an average spectrum efficiency; and
performing at least one network administrative task based on the venue value index;
wherein the data demand includes current unmet data demand and forecast unmet data demand.
2. The method according to claim 1, wherein the at least one network administrative task comprises reporting the venue value index from the network entity to a network operator or an owner of the area.
3. The method according to claim 2, wherein the network operator or the operator deploys wireless communication to fix the one or more wireless coverage issues, wherein the deploying include installing access points in the area.
4. The method according to claim 1, further comprising:
determining a return on investment for wireless communication deployment within the area based on the venue value index.

5. The method according to claim 4, further comprising:
displaying the return on investment and the venue value index to a network operator or an owner of the area, wherein the return on investment and the venue value index is displayed on a user equipment.

6. The method according to claim 1, further comprising: selecting the area to be assessed.

7. The method according to claim 6, wherein the area is within an individual building.

8. The method according to claim 1, wherein the data demand is calculated based on key performance indicators, and wherein the data demand comprises at least one of a busy hour excess traffic demand or a predicted excess traffic demand of the area.

9. The method according to claim 8, wherein the busy hour excess traffic demand depends on at least one of an extrapolated busy hour total traffic demand or a data volume at a hundred percent physical radio bearer utilization.

10. The method according to claim 1, further comprising:
creating a coverage prediction map for all cells in the area, wherein the coverage prediction map includes an indication of at least a server, a reference signal received power, or a signal-to-interference-plus-noise ratio in the area; and
displaying the distribution map on a user equipment.

11. The method according to claim 1, further comprising:
creating a user density distribution map for all cells in the area, wherein the user density distribution map includes the data demand information of the area; and
displaying the distribution map on a user equipment.

12. The method according to claim 11, further comprising:
embedding a busy hour excess traffic demand into the user density distribution map; and
displaying the user distribution map with the embedded busy hour excess traffic demand on a user equipment.

13. An apparatus comprising:
at least one memory comprising computer program code;
at least one processor;
wherein the at least one memory and the computer program code are configured, with the at least one processor, to cause the apparatus at least to:
identify one or more wireless coverage issues within an area;
receive data demand information for the area having the identified one or more wireless coverage issues;
receive or determine a total cost of ownership, wherein the total cost of ownership comprises a cost of fixing the one or more wireless coverage issues within the area;
calculate a venue value index of the area based on at least one of the total cost of ownership, the data demand information, or an average spectrum efficiency; and
perform at least one network administrative task based on the venue value index;
wherein the data demand includes current unmet data demand and forecast unmet data demand.

14. The apparatus according to claim 13, wherein the at least one network administrative task comprises reporting the venue value index from the network entity to a network operator or an owner of the area.

15. The apparatus according to claim 14, wherein the network operator or the operator deploys wireless communication to fix the one or more wireless coverage issues, wherein the deploying includes installing access points in the area.

16. The apparatus according to claim 13, wherein the at least one memory and the computer program code are configured, with the at least one processor, to cause the apparatus at least to:
determine a return on investment for wireless communication deployment within the area based on the venue value index.

17. The apparatus according to claim 16, wherein the at least one memory and the computer program code are configured, with the at least one processor, to cause the apparatus at least to:
display the return on investment and the venue value index to a network operator or an owner of the area, wherein the return on investment and the venue value index is displayed on a user equipment.

18. The apparatus according to claim 13, wherein the data demand is calculated based on key performance indicators, and wherein the data demand comprises at least one of a busy hour excess traffic demand or a predicted excess traffic demand of the area.

* * * * *